June 29, 1943.    G. MEYER    2,323,070
CHANGE SPEED GEAR
Filed Feb. 4, 1941
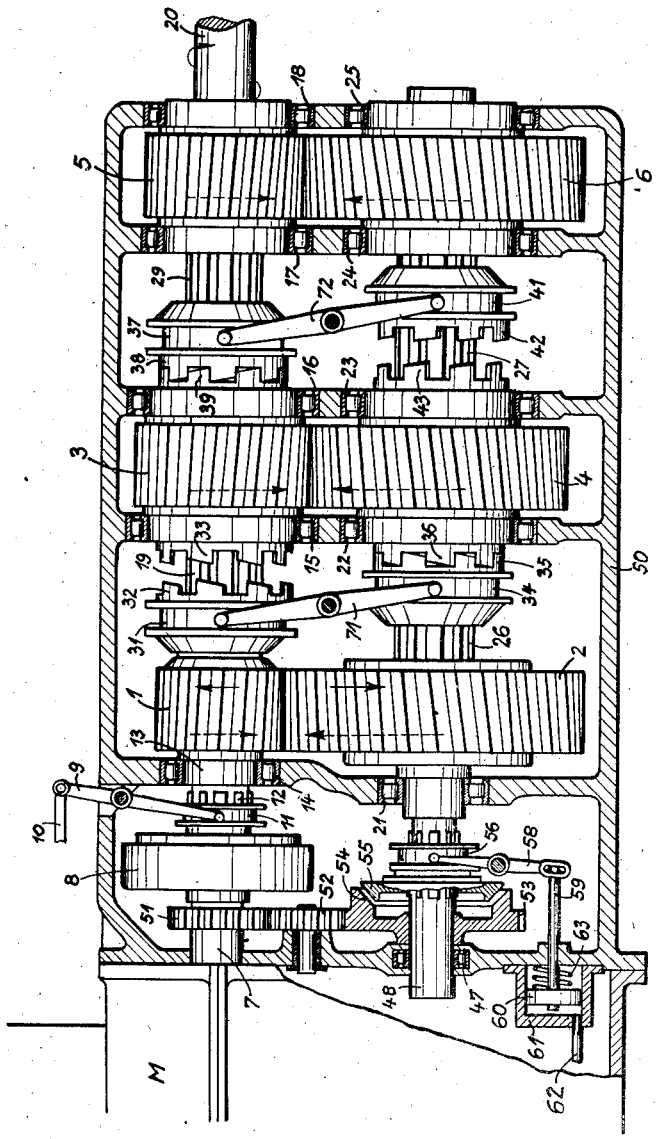
Inventor:
Gustav Meyer
By Edmund H. Parry Jr.
Attorney Patented June 29, 1943

2,323,070

UNITED STATES PATENT OFFICE 2,323,070

CHANGE SPEED GEAR

Gustav Meyer, Friedrichshafen-on-the-Bodensee, Germany; vested in the Alien Property Custodian Application February 4, 1941, Serial No. 377,363
In Germany February 2, 1940

6 Claims. (Cl. 74—339)

My invention relates to change speed gears especially in motor vehicles and has special reference to gears of this kind which are provided with so-called overrunning couplings, for example clutches having claws with so inclined front faces that when getting into touch the coupling halves are at first repulsed until the originally slower half is so speeded up or the originally faster half is so slowed down that the movement of rotation of the two halves in relation to each other is reversed, whereupon engagement takes place.

In change speed gears of this kind it is difficult to change into certain speeds when the vehicle is at rest, as certain coupling halves in connection with the motor side have to be slowed down so as to run slower than their respective other halves in connection with the car side in order to be engaged, and since the latter halves are standing still, overrunning in the desired direction is impossible.

According to my invention I avoid these difficulties by providing a special kind of braking device or clutch, for example a friction clutch or the like, having a member in rotating connection with rotating elements in the change speed gear and another member in direct rotating connection with the driving motor, and means for reversing one of said members as compared with the normal driving direction. For this purpose, according to my invention, I prefer to provide a reversing device driven by the incoming or motor shaft of the change speed gear and driving a first clutch element journaled for instance on the lay shaft or on an extension thereof and adapted to co-operate with a second clutch element which is in driving connection with one of the rotating members of the change speed gear which has to be reduced in speed for causing the desired engagement with a member standing still. As it is necessary to reduce the speed of rotation to such an extent that the member at rest overruns the other member this demand can only be fulfilled by reversing the direction of rotation of the rotating member so that, seen in the original turning direction, the member standing still now in effect rotates relatively faster than the other member rotating backwards. Thus it is a kind of braking which is performed by means of a braking element which instead of being fixed as is normally the case with one of the braking elements of prior types of brakes rotates in the direction reverse to the direction of rotation of the element to be braked. Therefore, in such cases in which a braking device for braking the faster running coupling half is provided anyhow, nothing else is necessary but means for rotating the normally fixed part of the brake in the direction reverse to the normal direction of rotation of the rotating part thereof.

The auxiliary friction or braking device need not be situated on the lay shaft, as will easily be seen when explaining the drawing, but I prefer to provide it there as this has the advantage of giving a comparatively simple construction.

Of course, the operation of the braking or friction device may be made depending on the course of the speed change, as explained in the U. S. Patent 2,086,723.

My invention is of special importance and advantage with heavy cars and vehicles which have to overcome great resistances. With vehicles of this kind after having started in a lower speed it is often not possible because of great resistances to perfect a change to a higher speed, because the car would come to a stop, whereas it would be possible to drive the car with such higher speed transmission after this was once set. Thus it is a great improvement with my invention to be able to set such higher speed transmission while the car stops and to start with full motor power.

Having given a general description of my invention I now want to point it out more in detail having reference to the drawing which represents an example embodying my invention.

The figure is a diagrammatical longitudinal section through the casing of a change speed gear showing the gears and clutches in side view but the new braking device mostly in section.

The left hand side is assumed to be the motor side of the change speed gear and shaft 7 is the outgoing shaft of the motor. There are three pairs of constantly meshing gear pairs 1/2, 3/4, 5/6. The main clutch 8 can be operated by means of sleeve 11, splined at 12 to the incoming shaft 13 of the speed gear, adapted to be shifted by levers 9 and 10. The shaft portions of the main shaft train are journaled at 14, 15, 16, 17 and 18. The out-going shaft is designated by the numeral 20; its direction of rotation is indicated by the arrow; shaft portions 19 and 29 having their opposing ends journaled inside of gear 3 (the bearings are not represented).

The lay shaft train is composed of two portions: 26 and 27; they are journaled at 21, 22, 23, 24 and 25.

There is a shiftable sleeve 31 splined to shaft portion 19 and being provided with a claw coupling half 32 the counterhalf 33 of which forms part of gear 3. In similar manner sleeve 34 is splined to lay shaft portion 26, its right hand side is shaped into claw coupling half 35 adapted to co-operate with claw coupling half 36 on the left hand side of gear 4.

Another shiftable sleeve 37 is splined to main shaft portion 29; its left hand side and the right hand side of gear 3 both are shaped to form two co-operating claw coupling halves 38 and 39, respectively. A similar sleeve 41 is splined to lay shaft portion 27, and its left hand side together with the right hand side of gear 4 form a claw coupling comprising coupling halves 42 and 43.

By means of double-armed lever 71 sleeves 31 and 34 are made to operate alternately; and similarly double-armed lever 72 causes alternate operation of sleeves 37 and 41.

Shaft portion 48 is a continuation of shaft portion 26, and is journaled at 21 and at 47.

The change speed gear and the main clutch are surrounded by a casing 50.

With the change speed gear represented it is possible to get four speeds in which the different elements are forming part of the transmission as follows:

*1st speed.*—Incoming shaft 13, gear 1, gear 2, shaft portion 26, coupling 35/36, gear 4, gear 3, coupling 38/39, shaft portion 29, out-going shaft 20;

*2nd speed.*—Incoming shaft 13, gear 1, gear 2, shaft portion 26, coupling 35/36, coupling 43/42, shaft portion 27, gear 6, gear 5, outgoing shaft 20;

*3rd speed (direct speed).*—Incoming shaft 13, shaft portion 19, coupling 32/33, coupling 39/38, shaft portion 29, outgoing shaft 20;

*4th speed (overspeed).*—Incoming shaft 13, shaft portion 19, coupling 32/33, gear 3, gear 4, coupling 43/42, shaft portion 27, gear 6, gear 5, out-going shaft 20.

The long arrows in dotted lines indicate the direction of rotation of the different gears.

On the motor or clutch shaft 7 a gear 51 is fixed which meshes with an intermediate gear 52, journaled in the casing 50, and this gear again is in driving connection with gear 53 loosely journaled on shaft 48. This latter gear on its right hand side has a friction cone 54, and a co-operating friction cone 55 is provided on sleeve 56 splined to shaft 48 and adapted to be shifted into and out of operation by means of lever 58, piston rod 59 and piston 60 sliding inside of cylinder 61. This piston may be moved by fluid pressure for instance, fed through conduit 62 and acting against the pressure of spring 63.

The operation of the device is as follows:

Assuming the vehicle to which the motor M and the change speed gear belong be at rest and the speed gear be set to the first speed, as indicated in the drawing, and it be desired to change to the third speed and to start therewith. For this purpose it is necessary to disengage coupling 35/36 and to cause engagement of coupling 32/33.

The inclination of the front faces of the claws of coupling 32/33 is so chosen that, when the gears are rotating and coupling 35/36 is disconnected the claws of coupling 32/33 getting into contact, these claws repulse each other (coupling half 32 running faster than coupling half 33) until coupling half 32 was so reduced in speed of rotation that coupling half 33 begins to overrun 32, in which moment the claws come to final engagement.

Now, if the vehicle is at rest both coupling halves 32 and 33 are standing still, and if now the motor is started coupling half 32 will run past coupling half 33 without getting into engagement, their claws repulsing each other.

For the purpose of coming to the desired engagement, main clutch 8 being disconnected, friction cones 54 and 55 are brought into engagement by allowing fluid pressure to enter into cylinder 61 by means of a control device (not represented). Consequently, shaft extension 48 and with it shaft portion 26 and gear 2 are rotated in the direction reverse to the normal direction of rotation, because of the reversing gear 52. This reverse direction of gear 2 is also transmitted to gear 1, shaft portion 13 and sleeve 31; it is indicated in the drawing by small arrows. Coupling half 32 beginning to rotate in this reverse direction and at the same time being pressed against coupling half 33 immediately gets into engagement therewith so that coupling 32/33 is connected. Then braking device or friction clutch 54/55 is disengaged and main clutch 8 is engaged by the driver. Now the vehicle may start in the desired speed.

I do not want to be limited to the details described or shown in the drawing as many variations will occur to those skilled in the art without deviating from the scope of my invention.

What I claim is:

1. In a change speed gear with constantly meshing gear pairs and couplings adapted to get into engagement after one half of one of said couplings has overrun its other half, an auxiliary friction device, said device comprising a first member adapted to be rotated independently of the change speed gear by the main driving engine, a second member adapted to rotate with one of the rotating elements of said change speed gear, means for causing one of said members to rotate in the direction reverse to the normal direction of rotation of said other member, and means for momentarily bringing said two members into contact to cause the member adapted to rotate with one of the rotating elements of the change speed gear to rotate reversely to its normal direction.

2. An auxiliary braking device for a change speed gear having constantly meshing gear pairs and coupling means selectively operative to effect a drive through different gear pairs, said device including a gear fixed to the outgoing shaft of the engine transmitting to the change speed gear, a gear loosely journaled on an extension of the lay shaft of the change speed gear, a third gear inserted between said two mentioned gears and being in constant mesh therewith, a sleeve splined to said lay shaft extension, a friction surface on said third gear and a friction surface on said sleeve, said friction surfaces being adapted to engage with each other, and means for shifting said two friction surfaces into and out of engagement.

3. In a change speed gear with constantly meshing gear pairs and couplings adapted to get into engagement after one half of one of said couplings has overrun its other half, a braking device for braking the speed of rotation of one half of a coupling comprising a first braking element rotatable with said coupling half and a coacting second element adapted to braking engagement with said first element, and means operative independently of the gear pairs of the change speed gear for causing the second element of said braking device to rotate reversely to the normal direction of rotation of the first braking element whereby, when said braking elements are engaged, the coupling half with which the first braking element is rotatable is rotated reversely to its normal direction of rotation relative to its coacting clutch half.

4. In a change speed gear a main shaft train having a power input shaft at one end adapted to be connected to a driving motor and having a power output shaft, a lay shaft train, selectively operative pairs of gears on said main and lay shaft trains, and means operative independently of the power input shaft of the main shaft train to rotate at least certain of the gears on the lay shaft train in a direction reverse to their normal direction of rotation.

5. In a change speed gear having a main shaft train and a lay shaft train including constantly meshing gear pairs and coacting coupling halves for selectively effecting a driving connection through the different gear pairs, a main clutch at the power input end of the main shaft train through which the main shaft train is adapted to be driven from a driving motor, a device for expediting engagement of coacting coupling halves, said device including means driven independently of the main clutch and operative through the lay shaft train to effect reverse rotation of a coupling half when said coupling half is running faster than its coacting coupling half, and means for rendering said reversing means operative and inoperative.

6. In a change speed gear with constantly meshing gear pairs and couplings adapted to get into engagement after one half of said coupling has overrun its other half, an engine shaft, a clutch through which the engine shaft drives the main shaft train of the change speed gear, an extension on the lay shaft train of the change speed gear, gearing means between the engine shaft and the lay shaft extension operative to rotate the lay shaft reversely to its normal direction of rotation, and friction clutch means for rendering said reverse gearing means operative and inoperative.

GUSTAV MEYER.